US012424377B2

(12) United States Patent
Arasawa et al.

(10) Patent No.: US 12,424,377 B2
(45) Date of Patent: Sep. 23, 2025

(54) COIL DEVICE

(71) Applicant: TDK CORPORATION, Tokyo (JP)

(72) Inventors: Takashi Arasawa, Tokyo (JP); Kouyu Ohi, Tsuruoka (JP); Yusuke Kimoto, Tokyo (JP); Tomoya Tsubai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 884 days.

(21) Appl. No.: 17/465,503

(22) Filed: Sep. 2, 2021

(65) Prior Publication Data

US 2022/0076879 A1 Mar. 10, 2022

(30) Foreign Application Priority Data

Sep. 7, 2020 (JP) ................................ 2020-149926

(51) Int. Cl.

| | |
|---|---|
| ***H01F 27/28*** | (2006.01) |
| ***H01F 17/04*** | (2006.01) |
| ***H01F 27/26*** | (2006.01) |
| ***H01F 27/29*** | (2006.01) |

(52) U.S. Cl.

CPC ....... *H01F 27/2828* (2013.01); *H01F 17/045* (2013.01); *H01F 27/26* (2013.01); *H01F 27/266* (2013.01); *H01F 27/29* (2013.01); *H01F 27/292* (2013.01)

(58) Field of Classification Search

CPC .... H01F 27/2828; H01F 17/045; H01F 27/26; H01F 27/266; H01F 27/29; H01F 27/292

USPC .................................................. 336/83, 192

See application file for complete search history.

(56) References Cited

U.S. PATENT DOCUMENTS

| | | | | |
|---|---|---|---|---|
| 2017/0263373 A1* | 9/2017 | Ashizawa | ............... | H01F 27/29 |
| 2020/0066435 A1* | 2/2020 | Igarashi | ................ | H01F 27/292 |

FOREIGN PATENT DOCUMENTS

| | | | | | |
|---|---|---|---|---|---|
| JP | 2005056934 A | * | 3/2005 | ........... | H01F 17/045 |
| JP | 2006-173203 A | | 6/2006 | | |
| JP | 2007088405 A | * | 4/2007 | ........... | H01F 17/045 |
| JP | 2014192169 A | * | 10/2014 | | |
| JP | 2017168538 A | * | 9/2017 | | |
| JP | 2020-031201 A | | 2/2020 | | |

* cited by examiner

*Primary Examiner* — Tszfung J Chan
(74) *Attorney, Agent, or Firm* — Oliff PLC

(57) ABSTRACT

A coil device includes a core having a flange portion connected to winding core portions; wires wound around the winding core portions; and terminal electrodes fixed to the core. The terminal electrodes have wire connectable portions to which lead portions of the wires are connected. In the wire connectable portions, the lead portions are connected to the terminal electrodes at positions separated from an upper surface of the flange portion by a predetermined height.

11 Claims, 6 Drawing Sheets

COIL DEVICE

BACKGROUND OF THE INVENTION

1. Field of the Invention

The present invention relates to a coil device suitable for mounting on, for example, a circuit substrate and so on.

2. Description of the Related Art

The coil device that is illustrated in JP 2006-173203 A or the like is known as a coil device. In a general coil device, a wire lead portion is connected to a terminal electrode using solder, a laser, or the like. In connecting the wire lead portion to the terminal electrode, there is a problem that the heat during, for example, laser bonding is easily transferred to the terminal electrode.

In a case where high heat is transferred to the vicinity of the mounting portion of the terminal electrode, the tin-plated layer formed on the outer surface of the terminal electrode may be partially melted and removed. In the event of the partial removal of the tin-plated layer formed on the outer surface of the terminal electrode positioned near the mounting portion of the terminal electrode, it becomes difficult for a solder fillet to be formed at that part and coil device mounting inferiority may arise with respect to a circuit substrate.

SUMMARY OF THE INVENTION

The present invention has been made in view of such circumstances, and an object of the present invention is to provide a coil device with little mounting inferiority.

In order to achieve the above object, a coil device according to the present invention includes:

- a core having a flange portion connected to a winding core portion;
- a wire wound around the winding core portion; and
- a terminal electrode attached to the flange portion, wherein
- the terminal electrode has a wire connectable portion to which a lead portion of the wire is connected, and
- the lead portion connected to the wire connectable portion is arranged at a predetermined height from an upper surface of the flange portion.

In the coil device according to the present invention, the lead portion connected to the wire connectable portion is arranged at a predetermined height from the upper surface of the flange portion. Accordingly, the heat generated when the lead portion is connected to the terminal electrode can be prevented from being transferred as high heat to the vicinity of the mounting portion of the terminal electrode. Accordingly, a solder adhesion reinforcing layer such as the tin-plated layer formed on the outer surface of the terminal electrode is unlikely to be partially melted and removed near the mounting portion of the terminal electrode. As a result, a solder fillet is formed with ease and the mounting inferiority of the coil device with respect to a circuit substrate or the like can be reduced.

In addition, the part where the lead portion of the wire is connected to the wire connectable portion is separated from the flange portion, and thus it also becomes difficult for the heat for connecting the lead portion of the wire to the wire connectable portion to be transferred to the core and deterioration of the core can also be prevented. In addition, for the same reason, work for connecting the lead portion of the wire to the wire connectable portion (laser welding or thermocompression bonding) is facilitated.

Preferably, the wire connectable portion has:

- a base piece of the wire connectable portion arranged above the flange portion; and
- a folded piece connected and extending to the base piece and folded back from the base piece, and
- the lead portion of the wire is connected to the folded piece.

With such a configuration, the heat for connecting the lead portion of the wire to the folded piece is dissipated when the heat is transferred from the folded piece to the part where the folded piece and the base piece are connected (such as a rising piece) and it becomes difficult for the heat to be transferred from the base piece and the terminal main portion to the mounting portion. As a result, the terminal main portion positioned close to the mounting portion and the solder adhesion reinforcing layer (such as a tin-containing layer) formed on the outer surface of the mounting portion become less likely to deteriorate due to heat and the bonding strength of a circuit substrate and the terminal electrode during mounting is improved.

In addition, the part where the lead portion of the wire is connected to the terminal electrode is separated from the flange portion, and thus it also becomes difficult for the heat for connecting the lead portion of the wire to the folded piece to be transferred to the core and deterioration of the core can also be prevented. In addition, for the same reason, work for connecting the lead portion of the wire to the folded piece (laser welding or thermocompression bonding) is facilitated.

Preferably, a space gap is formed so that no wire is present between the base piece and the folded piece. In a case where the lead portion of the wire enters between the base piece and the folded piece, the lead portion of the wire that has entered the space gap serves as a heat transfer member and the heat for bonding the lead portion may be directly transferred from the wire to the connecting wire base. However, in a case where the space gap is formed so that no wire is present between the base piece and the folded piece, heat transfer from the lead portion of the wire that has entered the space gap to the base piece can be effectively prevented.

In addition, by the space gap being formed, a jig or the like for connecting the wire lead portion to the folded piece can also be inserted into the gap space.

Preferably, a width of the space gap (the distance between the base piece and the folded piece) is 0.3 times or more a wire diameter of the wire. Although heat dissipation is enhanced and heat transfer from the folded piece to the base piece is reduced as the width of the space gap increases, a limitation is given based on the height limitation of the coil device.

Preferably, a total length extending along an inner surface of the space gap from a position of the base piece corresponding to an outer end surface of the flange portion toward a tip of the folded piece is twice or more a width of the flange portion. The lead portion of the wire is bonded in the tip portion of the folded piece, and thus the heat generated in the tip portion of the folded piece is transferred from the tip of the folded piece to the base piece along the total length extending along the inner surface of the space gap and can be dissipated with a sufficient length.

Preferably, the lead portion is pulled out from the winding core portion toward an upper portion of the folded piece and extends outward along the upper portion of the folded piece. With such a configuration, the lead portion can be connected to the tip portion of the folded piece without entering the space gap and heat dissipation is improved.

Preferably, at least a part of a bonding part where the lead portion is connected at a tip of the folded piece protrudes beyond an outer end surface of the flange portion. With such a configuration, work for connecting the lead portion of the wire to the folded piece is facilitated and it becomes difficult to transfer the heat for connecting the lead portion of the wire to the folded piece to the base piece.

Preferably, a predetermined gap is formed between the base piece and the upper surface of the flange portion. The gap between the base piece and the upper surface of the flange portion suppresses heat transfer from the base piece to the flange portion. In addition, the heat dissipation of the base piece itself is also improved.

Preferably, the folded piece has a caulking piece holding the lead portion of the wire. By the caulking piece holding the lead portion of the wire, work for connecting the lead portion to the wire connectable portion is facilitated.

Preferably, the terminal electrode further comprises:

a terminal main portion arranged on an outer end surface of the flange portion with one end of the terminal main portion connected to the wire connectable portion, and a mounting portion provided at the other end of the terminal main portion; and the terminal main portion close to the mounting portion has a protruding portion protruding in a direction away from the outer end surface of the flange portion.

The protruding portion protruding from the outer end surface of the flange portion is formed on the terminal main portion close to the mounting portion. Accordingly, although the stress that is generated in the circuit substrate or the like is transmitted to the mounting portion of the terminal electrode, it becomes difficult to transmit the stress to the core as the protruding portion functions as a stress buffer when the stress is transmitted from the mounting portion to the terminal main portion through the protruding portion. Accordingly, the stress that is transmitted to the core can be mitigated, cracking or the like of the core can be effectively prevented, and durability is improved.

In addition, the protruding portion protrudes from the outer end surface of the flange portion. Accordingly, when the mounting portion of the terminal electrode of the coil device is connected to the circuit substrate with solder or the like, the solder adhered to the mounting portion crawls up from the mounting portion along the outside of the protruding portion and a solder fillet is formed. By the solder fillet being formed outside the protruding portion, the state of the solder fillet can be confirmed with ease in a case where the coil device connected to the circuit substrate is viewed from above (plan view) and mounting inferiority can be efficiently suppressed.

Preferably, a predetermined gap is formed between the outer end surface of the flange portion and the protruding portion of the terminal electrode. By the predetermined gap being formed, the stress buffering function is improved, the area of contact between the terminal electrode and the core is also reduced, the stress from the substrate becomes less likely to be transmitted to the core, and durability is improved.

Preferably, a conductive plate piece constitutes the terminal electrode. The conductive plate piece preferably has a substantially constant plate thickness. A metal plate piece or the like constitutes the conductive plate piece. The terminal main portion and the mounting portion are integrally molded on the conductive plate piece. Preferably, the protruding portion is continuous from the mounting portion to the terminal main portion at a position between the mounting portion and the terminal main portion.

The gap between the mounting portion and the mounting side lower surface of the flange portion may be or exceed 0. Preferably, the mounting portion and the lower surface of the flange portion are not adhered to each other. Preferably, the mounting portion of the terminal electrode and the mounting side lower surface of the flange portion are relatively movable. With such a configuration, the stress from the circuit substrate or the like is not directly transmitted from the mounting portion of the terminal electrode to the lower surface of the core and the stress buffering function is also improved. It should be noted that the mounting portion of the terminal electrode and the mounting side lower surface of the flange portion may be partially in contact with each other.

The core may further have another winding core portion arranged in parallel to the winding core portion and connected to the flange portion. For example, the core may be an annular core. In that case, the coil device may be a coil device in which wires are wound in parallel around two rows of winding core portions between two flange portions. A coil device configured as described above can be suitably used as a common mode filter, a common mode choke coil, and so on.

Further, the coil device may further have a partition portion mounted on the inner end surface of the flange portion between the winding core portion and the other winding core portion. In addition, the coil device may further have a cover attached to the flange portion, wherein the cover is above an upper part of the winding core portion around which the wire is wound is covered. The partition portion may be molded integrally with the cover.

Preferably, a notch is formed in the cover and the notch accommodates the wire connectable portion. By the notch accommodating the wire connectable portion, the portion of the wire connectable portion connected to the lead portion can be effectively protected, the height of the portion of the wire connectable portion connected to the lead portion can be increased in accordance with the depth of the notch, and heat dissipation is also improved.

DETAILED DESCRIPTION OF THE PREFERRED EMBODIMENTS

Figure 1A:
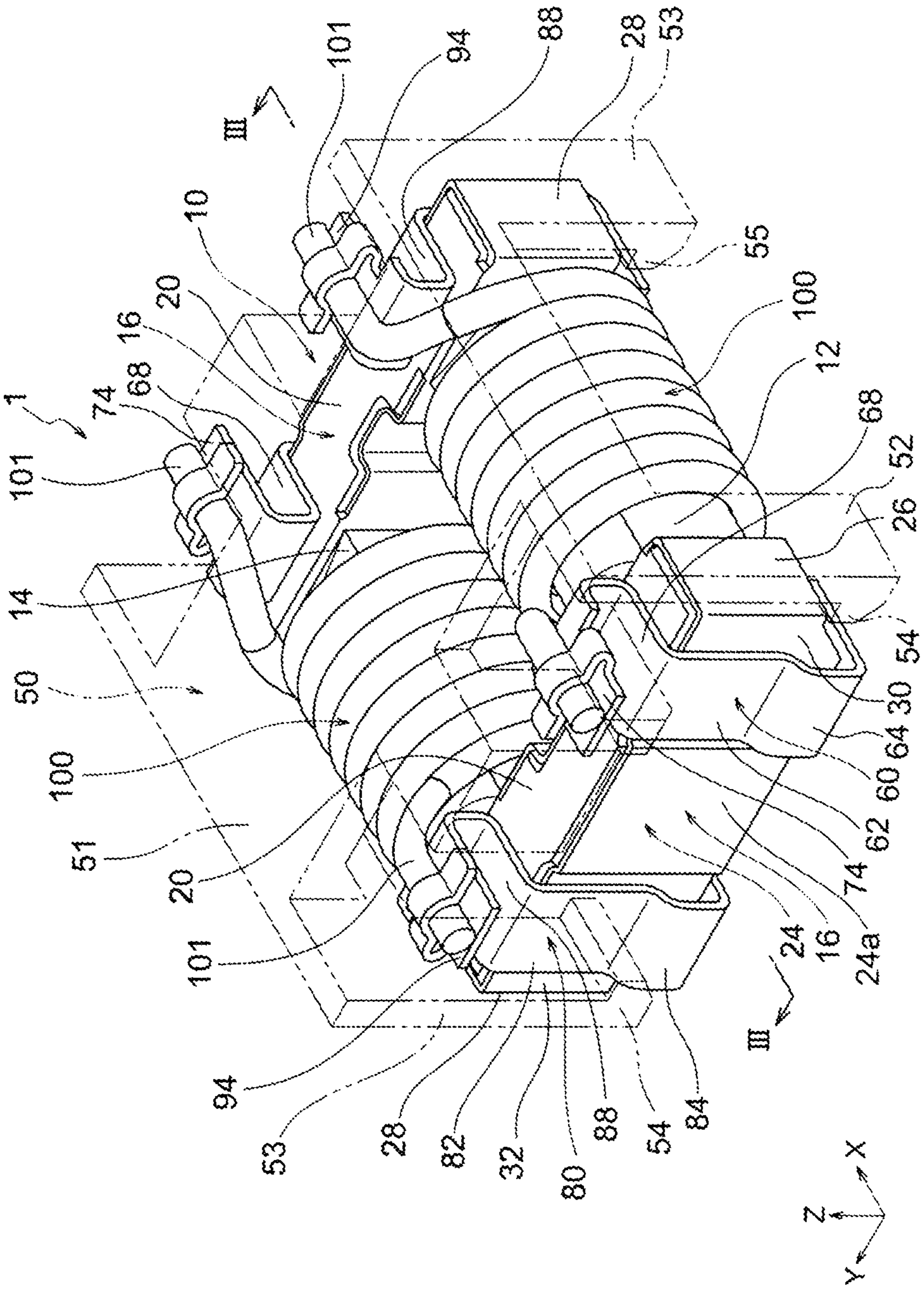
FIG. 1A is a perspective view of a coil device according to an embodiment of the present invention.

Hereinafter, the present invention will be described based on the embodiments illustrated in the drawings. It should be noted that the X axis, the Y axis, and the Z axis in the drawings are substantially perpendicular to each other.

First Embodiment

A coil device 1 according to an embodiment of the present invention illustrated in FIG. 1A is suitably used as, for example, a common mode filter, a common mode choke coil, or the like and has a core 10, wires 100 and 100, and terminal electrodes 60 and 80. In the present embodiment, the coil device 1 further has a cover 50.

Figure 2:
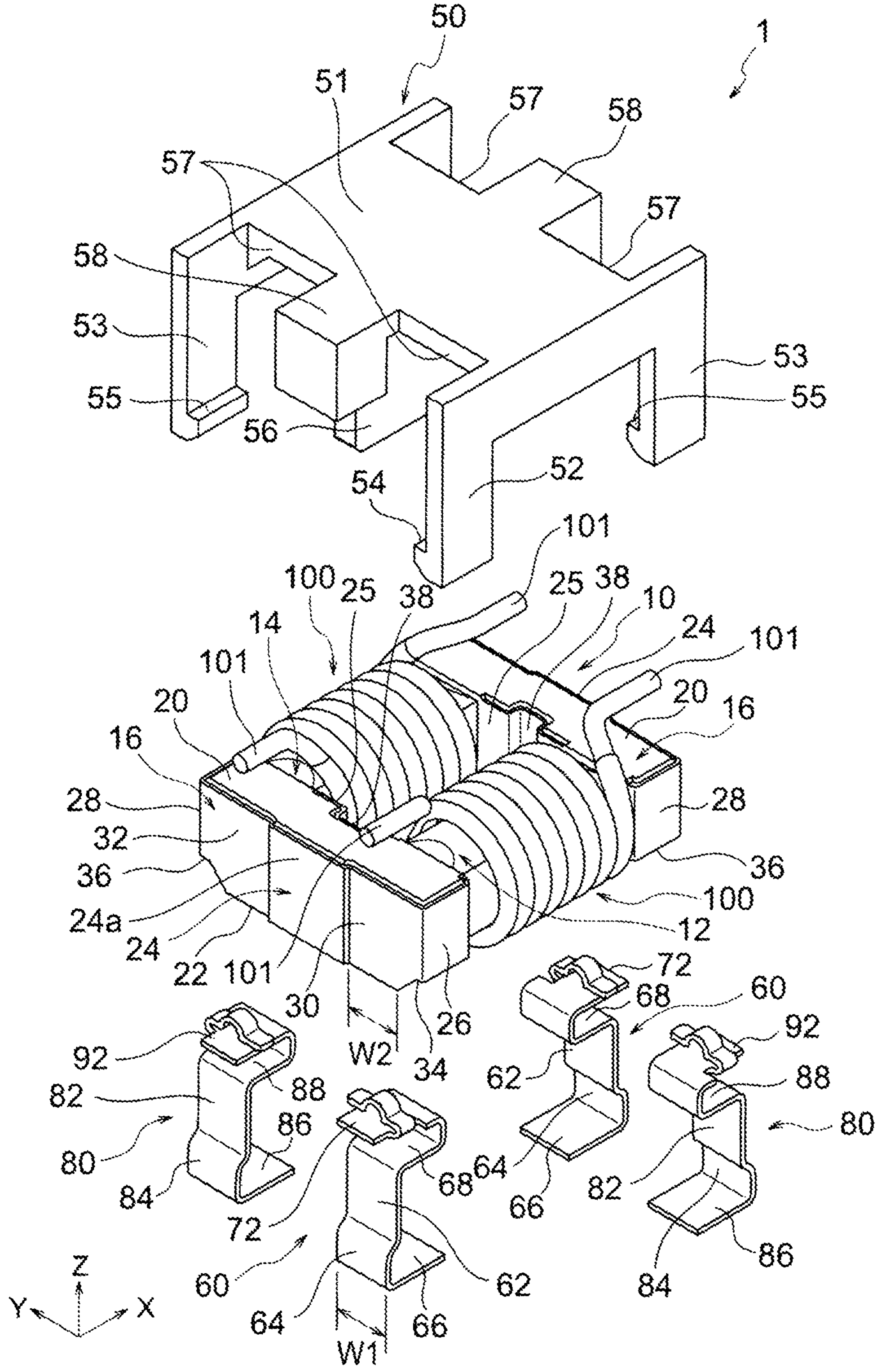
FIG. 2 is an exploded perspective view of the coil device illustrated in FIG. 1A.

As illustrated in FIG. 2, the core 10 has two winding core portions 12 and 14 arranged in parallel (arranged in parallel) along the X-axis direction at a predetermined interval in the Y-axis direction. One flange portion 16 is connected to one end of the two winding core portions 12 and 14 along the X axis, and the other flange portion 16 is connected to the other end of the two winding core portions 12 and 14 along the X axis. In the present embodiment, the core 10 is an annular core. The core 10 may be integrally molded or molded bodies may be combined and assembled in the annular core.

The wires 100 and 100 are wound around the winding core portions 12 and 14, respectively. Coil portions are formed as a result. What can be used as the wire 100 is not particularly limited, and examples thereof include conductive core wires such as a flat wire, a round wire, a stranded wire, a litz wire, and a braided wire made of copper or the like and wires obtained by performing insulation coating on the conductive core wires. Although the wire diameter of the wire 100 is not particularly limited, it has an outer diameter larger than the plate thickness of the terminal electrodes 60 and 80 in the present embodiment. For example, the outer diameter is approximately 1.2 to 5 times the plate thickness of the terminal electrodes 60 and 80.

In the present embodiment, the wires 100 and 100 are respectively wound around the winding core portions 12 and 14 in mutually opposite rotation directions and with the same number of turns (or different numbers of turns). Each flange portion 16 is equipped with the two terminal electrodes 60 and 80.

A lead portion 101 that is one end portion (left side in FIG. 2) of the wire 100 wound around the winding core portion 12 arranged on the front side along the Y axis in FIG. 2 is connected to the terminal electrode 60 arranged on the one flange portion 16. In addition, the lead portion 101 that is the other end portion (right side in FIG. 2) of the wire 100 is connected to the terminal electrode 80 arranged on the other flange portion 16. Likewise, the lead portion 101 that is one end portion of the wire 100 wound around the winding core portion 14 arranged on the back side along the Y axis in FIG. 2 is connected to the terminal electrode 80 arranged on the one flange portion 16 and the lead portion 101 that is the other end portion of the wire 100 is connected to the terminal electrode 60 arranged on the other flange portion 16.

The flange portions 16 and 16 arranged on the mutually opposite sides of the core 10 along the X axis have mutually point-symmetrical configurations. Each of the flange portions 16 and 16 has an outer end surface 24 positioned at an end of the core 10 along the X axis, an inner end surface 25 positioned on the side opposite thereto, a mounting side lower surface 22, an upper surface 20 positioned on the side opposite thereto, and first and second side surfaces 26 and 28 positioned at both ends of the core 10 along the Y axis.

The outer end surface 24 of each flange portion 16 has a central outer end surface **24*a* positioned at the center in the Y-axis direction and lateral outer end surfaces 30 and 32 positioned on both sides of the central outer end surface 24*a* in the Y-axis direction. Although the lateral outer end surfaces 30 and 32 are slightly recessed in a stepped shape along the X axis from the central outer end surface 24*a*, the outer end surfaces 24*a*, 30, and 32 are substantially parallel to a plane including the Z axis and the Y axis. Although the height along the X axis of the step between the central outer end surface 24*a* and the lateral outer end surface 30 or 32 may be 0, it is preferable that the height is approximately the plate thickness of the terminal electrode 60 or 80** or less.

One X-axis end of the winding core portion 12 and one X-axis end of the winding core portion 14 are integrally connected to the inner end surface 25 of each flange portion 16. A groove portion 38 extending along the Z axis from the upper surface 20 of the flange portion 16 toward the mounting side lower surface 22 is formed at the center of the inner end surface 25 of each flange portion 16 in the Y-axis direction. The groove portion 38 is positioned in the middle of the part where the winding core portions 12 and 14 are connected to the flange portion 16.

Figure 3:
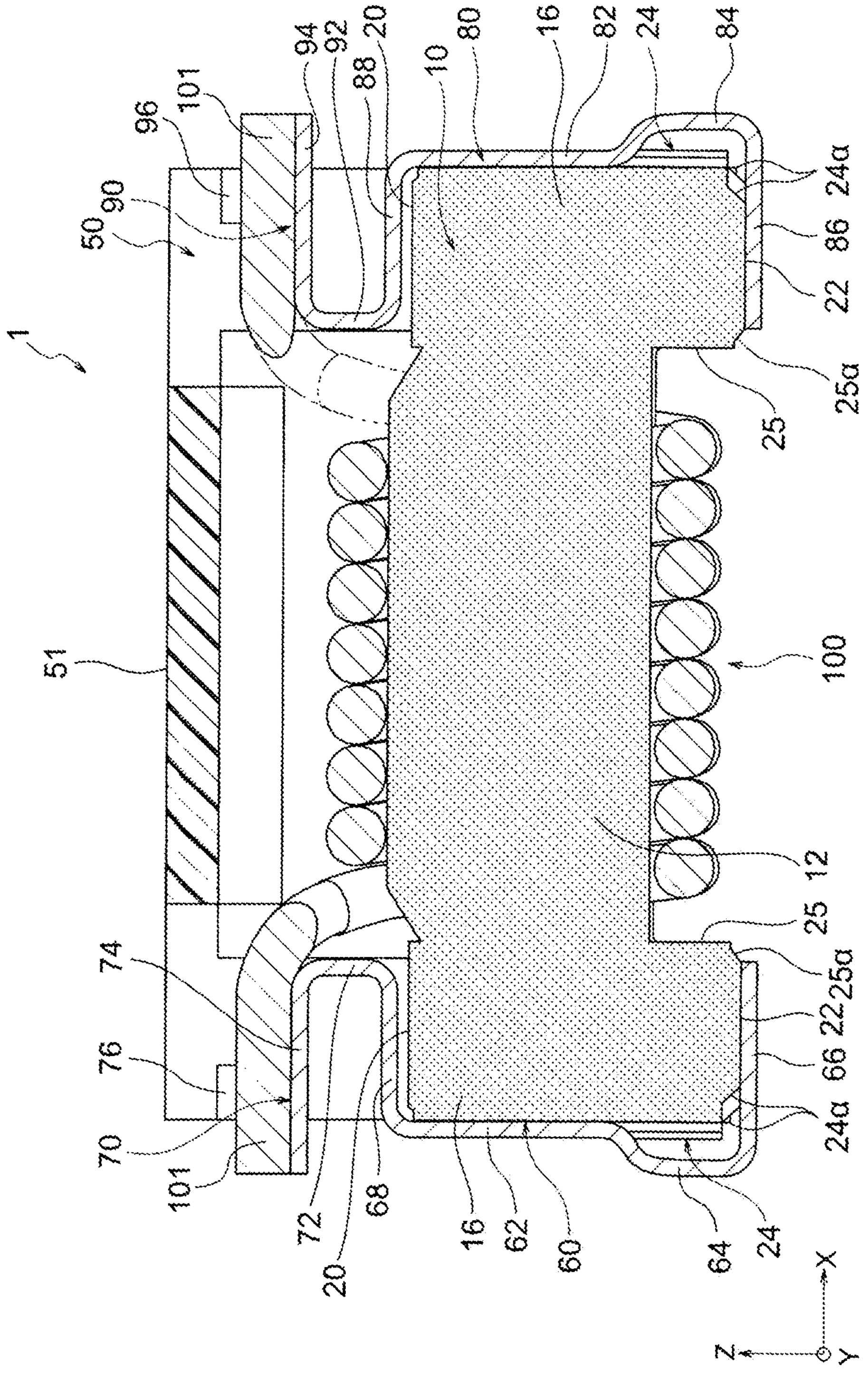
FIG. 3 is a cross-sectional view of the coil device taken along line illustrated in FIG. 1A.

As illustrated in FIG. 3, a chamfered portion **25*a* is formed over the mounting side lower surface 22 below the inner end surface 25 of each flange portion 16 on the Z axis. In addition, a chamfered portion 24*a* is formed over the mounting side lower surface 22 below the outer end surface 24 on the Z axis. By the chamfered portions 24*a* and 25*a* being present, the molding (die-cutting) of the core 10 is facilitated and adhesion of solder 5 illustrated in FIG. 4 to the core 10** can be suppressed.

Although the upper surface 20 of each flange portion 16 in the present embodiment is lower than the maximum height of the winding core portion 12 along the Z axis by a predetermined step height (preferably, 0.5 to 5 times the plate thickness of the terminal electrode 60 or 80) as illustrated in FIG. 3, the step height may be 0. In addition, the upper surface 20 of each flange portion 16 may be configured to be higher than the maximum height of the winding core portion 12 along the Z axis.

As illustrated in FIG. 2, at both ends of each flange portion 16 in the Y-axis direction, the Z-axis lower ends of the first side surface 26 and the second side surface 28 are notched and locking receiving portions 34 and 36 are respectively formed. Locking claws 54 and 55 formed at the lower ends of leg portions 52 and 53 provided at the four corners of the cover 50 are detachably engaged with the locking receiving portions 34 and 36.

Since the notch-shaped locking receiving portions 34 and 36 are formed below both ends of each flange portion 16 in the Y-axis direction, the width of the mounting side lower surface 22 in the Y-axis direction is smaller than the width of the upper surface 20 in the Y-axis direction. However, the width of the mounting side lower surface 22 in the Y-axis direction is larger than the width of the central outer end surface **24*a* in the Y-axis direction and is determined such that a sufficient dimension can be secured as a width W1 of the mounting side lower surface 22 side of the lateral outer end surfaces 30 and 32**.

As illustrated in FIG. 2, the cover 50 has a tabular lid portion 51 and the leg portions 52 and 53 respectively branching off along the X axis from both ends of the lid portion 51 along the Y axis and then respectively protruding downward on the Z axis. The locking claws 54 and 55 are integrally molded at the lower ends of the leg portions 52 and 53 along the Z axis, respectively.

In addition, the cover 50 has a pair of projecting block portions 58 protruding from the center of the lid portion 51 along the Y axis to both sides along the X axis. The projecting block portion 58 is capable of abutting against the center of the upper surface 20 of the flange portion 16 along the Y axis. A plate-shaped partition portion 56 as a bridge between the pair of projecting block portions 58 is integrally formed on the lower surface of the lid portion 51 positioned at the center along the Y axis.

The lower end of the plate-shaped partition portion 56 along the Z axis protrudes further downward than the lower end of the projecting block portion 58 along the Z axis, and both side ends of the plate-shaped partition portion 56 along the X axis are attached to the groove portions 38 formed in the inner end surfaces 25 of the flange portions 16 so as to be slidable upward and downward. The partition portion 56 is capable of effectively preventing the wires 100 and 100 respectively wound in a coil shape around the winding core portions 12 and 14 from coming into contact with each other and ensuring insulation therebetween. It should be noted that the coil device 1 is transferred with ease by the upper surface of the lid portion 51 of the cover 50 being flat and adsorbed by an adsorption nozzle or the like.

In the lid portion 51 of the cover 50, notches 57 are formed at both side positions of the projecting block portions 58 in the Y-axis direction. Wire connectable portions 70 and 90 (described later) of the terminal electrodes 60 and 80 enter the notches 57. By the notches 57 accommodating the wire connectable portions 70 and 90, the portions of the wire connectable portions 70 and 90 connected to the lead portions 101 can be effectively protected, the heights of the portions of the wire connectable portions 70 and 90 connected to the lead portions 101 can be increased in accordance with the depth of the notch 57 (Z-axis height of the projecting block 58), and heat dissipation is also improved.

Although the cover 50 is made of a non-magnetic material such as resin, the resin may contain a magnetic material such as a metal magnetic material or ferrite. In addition, the cover 50 may be made of a magnetic material such as a metal magnetic material or ferrite as in the case of the core 10. In a case where the cover 50 is made of a magnetic material or the cover 50 contains a magnetic material, the cover 50 constitutes a closed magnetic path together with the core 10.

Figure 5:
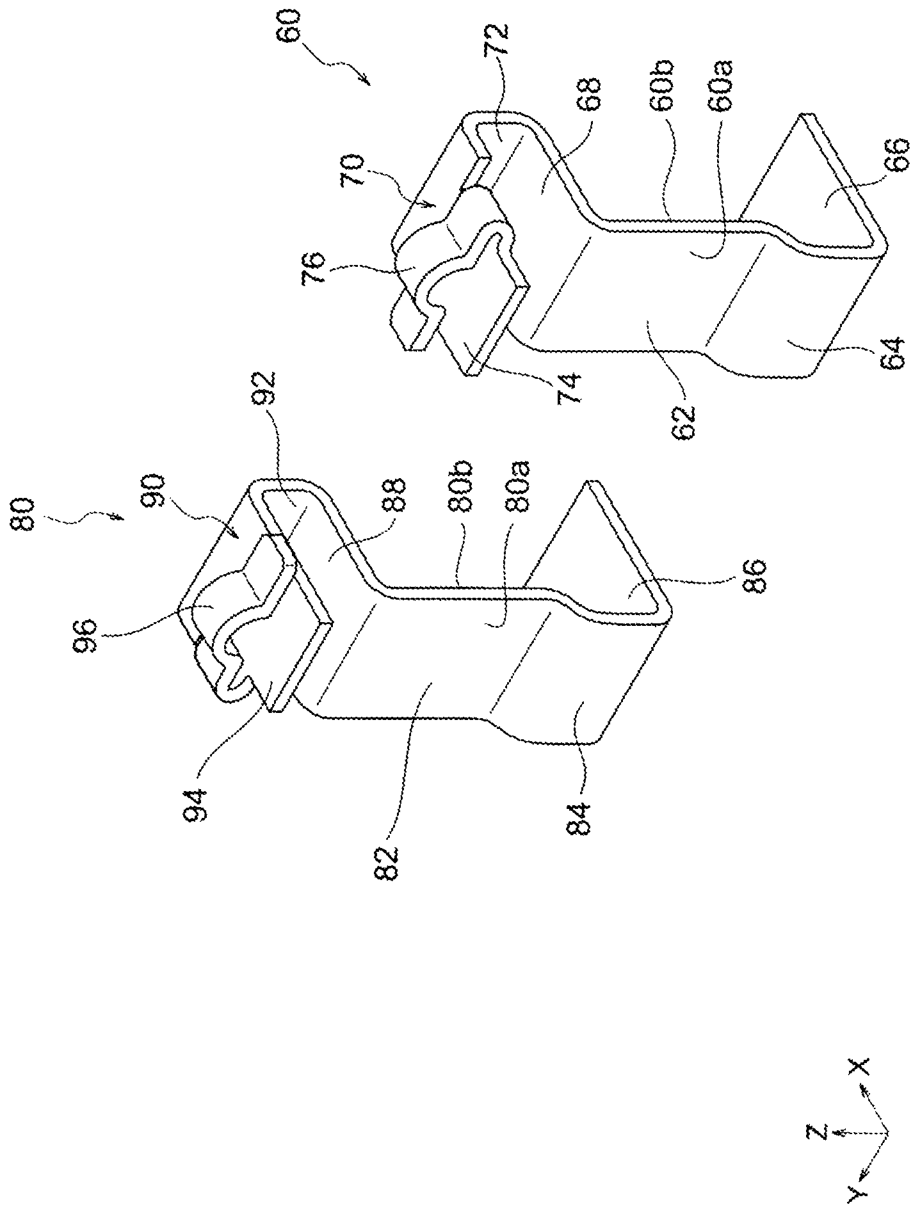
FIG. 5 is a perspective view of a terminal electrode part of the coil device illustrated in FIG. 1A.

As illustrated in FIG. 5, the terminal electrodes 60 and 80 respectively have terminal main pieces (terminal main portions) 62 and 82, protruding pieces (protruding portions) 64 and 84, mounting pieces (mounting portions) 66 and 86, and the wire connectable portions 70 and 90 and these are molded by bending one metal piece having a substantially constant plate thickness. It should be noted that the shapes of the terminal electrode 60 and the terminal electrode 80 are bilaterally symmetrical. As illustrated in FIG. 3, each of the wire connectable portions 70 and 90 is a part to which the lead portion 101 of the wire 100 is connected. In the present embodiment, the wire connectable portions 70 and 90 have base pieces 68 and 88, rising pieces 72 and 92, folded pieces 74 and 94, and caulking pieces 76 and 96, respectively.

The base pieces 68 and 88 are substantially vertically bent and molded from the upper ends of the terminal main pieces 62 and 82 along the Z axis toward the upper surfaces 20 and 20 of the flange portions 16 and 16 so as to be substantially parallel to the upper surfaces 20 and 20 of the flange portions 16 and 16 with a predetermined gap, respectively. It should be noted that the base pieces 68 and 88 may be in contact with the upper surfaces 20 and 20 although it is preferable that the base pieces 68 and 88 are arranged substantially parallel to the upper surfaces 20 and 20 of the flange portions 16 and 16 with a predetermined gap.

At the positions of the upper surfaces 20 and 20 close to the inner end surfaces 25 of the flange portions 16 and 16, the rising pieces 72 and 92 are formed by being bent and molded in a straight line (or in a curved or zigzag shape) and upward along the Z axis from the inside ends of the base pieces 68 and 88 along the X axis (sides close to the center of coil device 1). In addition, from the upper ends of the rising pieces 72 and 92 along the Z axis, the folded pieces 74 and 94 are formed by being substantially vertically bent and molded toward the outside (outside from the center of the coil device 1) along the X axis. The folded pieces 74 and 94 are arranged substantially parallel to the base pieces 68 and 88, respectively. Space gaps 100 are formed so that no wire is present therebetween.

As illustrated in FIG. 5, in the middle of the folded pieces 74 and 94 along the X axis, the caulking pieces 76 and 96 are integrally bent and molded so as to be folded back on the folded pieces 74 and 94 from the side ends of the folded pieces 74 and 94 along the Y axis, respectively. As illustrated in FIG. 3, the lead portions 101 of the wires 100 can be sandwiched between the folded pieces 74 and 94 and the caulking pieces 76 and 96.

The lead portions 101 of the wires 100 and the folded pieces 74 and 94 and/or the caulking pieces 76 and 96 are connected by a method such as laser welding, solder connection, thermocompression bonding, arc welding, and resistance welding. Preferably, the lead portions 101 of the wires 100 are connected near the tip portions of the folded pieces 74 and 94 and the bonding tip portions thereof slightly protrude to the outside in the X-axis direction from the outer end surfaces 24 of the flange portions 16 and 16. The connection work is facilitated, and the core is easily and effectively protected from laser light, heat, and so on during the connection.

As illustrated in FIG. 3, the terminal main pieces 62 and 82 are arranged so as to face the outer end surfaces 24 and 24 of the flange portions 16 and 16 and the mounting pieces 66 and 86 are arranged so as to face the mounting side lower surfaces 22 of the flange portions 16 and 16. Although the mounting pieces 66 and 86 in the present embodiment are arranged so as to abut against the mounting side lower surfaces 22 of the flange portions 16 and 16, the mounting pieces 66 and 86 may be arranged so as to face the mounting side lower surfaces 22 of the flange portions 16 and 16 with a slight gap without being limited thereto. Preferably, the mounting pieces 66 and 86 and the mounting side lower surfaces 22 of the flange portions 16 do not adhere to each other.

In the present embodiment, on the terminal main pieces 62 and 82 close to the mounting pieces 66 and 86, the protruding pieces (protruding portions) 64 and 84 protruding in directions away from the outer end surfaces 24 and 24 of the flange portions 16 and 16 are molded integrally with the respective pieces 62 and 66 (82 and 86). Predetermined gaps are formed between the protruding pieces (protruding portions) 64 and 84 and the outer end surfaces 24 and 24 of the flange portions 16 and 16.

As illustrated in FIG. 1A, in the present embodiment, the terminal main pieces 62 and 82 adhere, using an adhesive, to the lateral outer end surfaces 30 and 32 positioned on both sides of the outer end surface 24 of the flange portion 16 in the Y-axis direction, respectively. It is preferable that the adhesion of the terminal main pieces 62 and 82 to the outer end surface 24 of the flange portion 16 is performed at upper positions away from the protruding pieces 64 and 84.

Figure 4:
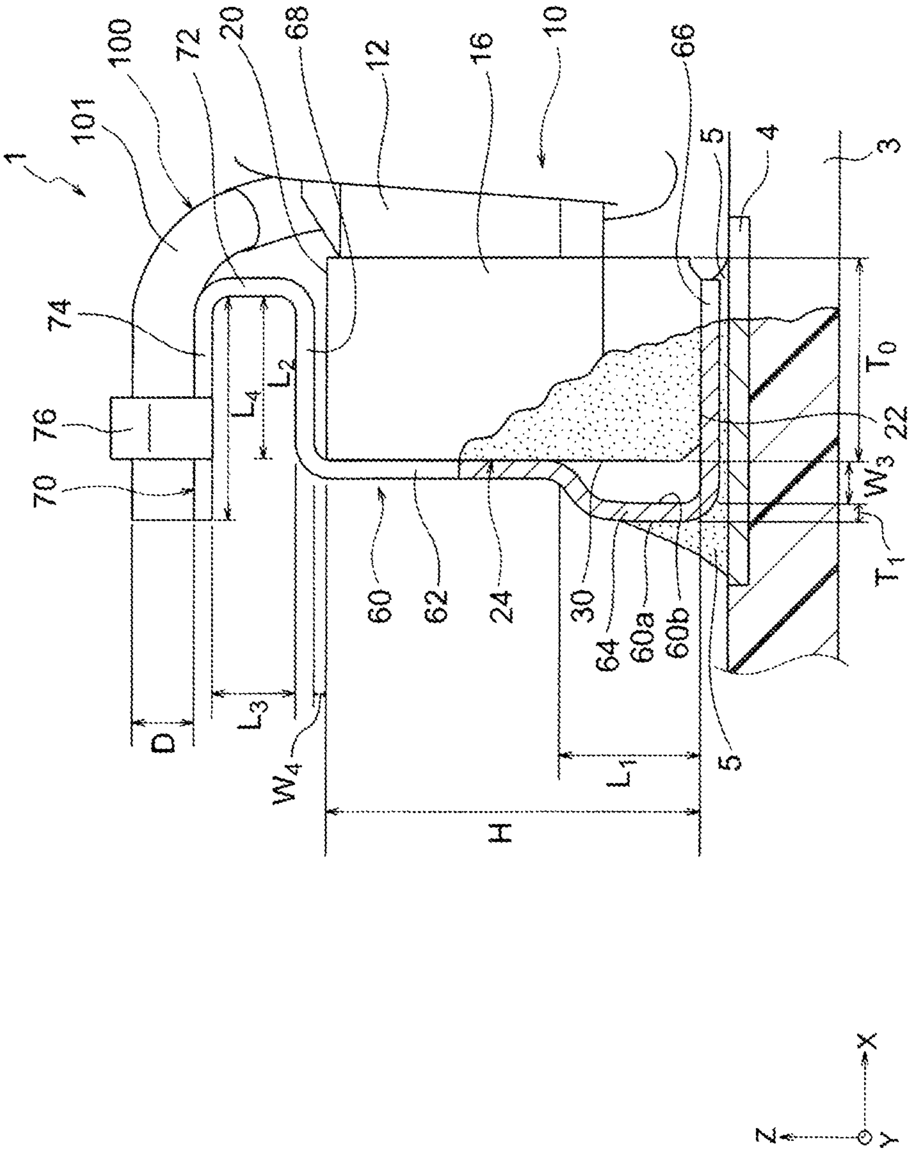
FIG. 4 is a partially enlarged side view of the coil device in FIG. 3 that is mounted.

Next, details will be described with reference to FIG. 4. Only the terminal electrode 60 is illustrated in FIG. 4, and only the terminal electrode 60 will be referred to and mainly described. The same applies to the terminal electrode 80, description of which is omitted.

In the present embodiment, a gap space having a predetermined width W3 is formed between an inner surface 60*b* of the protruding piece 64 and the outer end surface 24 of the flange portion 16. Preferably, the predetermined width W3 is 0.5 times or more a thickness T1 of the protruding piece 64. More preferably, the predetermined width W3 is 5 times or less the thickness T1 of the protruding piece 64. Further preferably, the predetermined width W3 is 3 times or less the thickness T1 of the protruding piece 64. In addition, a height L1 of the protruding piece 64 along the Z axis is preferably ⅕ times or more, more preferably ¼ times or more, preferably ⅔ times or less, and more preferably ½ times or less a height H of the flange portion 16.

In addition, although a length L2 of the base piece 68 along the X axis is preferably smaller than a width T0 of the flange portion 16 along the X axis, the length L2 may be equal to or greater than the width T0. L2/T0 is preferably ½ or more, more preferably ¾ or more, and particularly preferably ⅘ or more. In addition, the base piece 68 is preferably arranged so as to face the upper surface 20 of the flange portion 16 with a gap having a width W4. The width W4 is preferably 0 or more and more preferably 0.1 times or more the thickness (=T1) of the base piece 68.

Preferably, a length L4 of the folded piece 74 along the X axis is equal to or greater than or longer than the length L2 of the base piece 68 along the X axis. In addition, a gap width L3 between the folded piece 74 and the base piece 68 is preferably 0.3 times or more, more preferably 0.5 times or more, and particularly preferably once or more a wire diameter D. The upper limit of the gap width L3 is determined from the height limitation of the coil device 1 or the like and is, for example, 3 times or less. In addition, in the present embodiment, the total length of L2+L4+L3 is preferably twice or more the width T0 of the flange portion 16 along the X axis.

Although the tip portion of the folded piece 74 in the present embodiment slightly protrudes to the outside in the X-axis direction from the outer end surface 24 of the flange portion 16 and substantially to the same extent as an outer surface 60*a* of the protruding piece 84 in the X-axis direction, the tip portion may be arranged so as to be recessed or further protrude beyond the outer surface 60*a* of the protruding piece 84 in the X-axis direction.

The terminal electrode 60 is made of a metal such as tough pitch steel, phosphor bronze, brass, iron, nickel, a nickel alloy, and stainless steel. The terminal electrode 60 can be integrally molded by, for example, performing punching pressing and bending molding on a conductive metal plate. In addition, it is preferable that a plating film of tin, an alloy containing tin, or the like is formed as a solder adhesion reinforcing layer on the outer surface 60*a* of the terminal electrode 60.

In the coil device 1 according to the present embodiment, the heat for connecting the lead portion 101 of the wire 100 to the folded piece 74 is dissipated when the heat is transferred from the folded piece 74 to the part where the folded piece 74 and the base piece 68 are connected (such as the rising piece 72) and it becomes difficult for the heat to be transferred from the base piece 68 and the terminal main piece 62 to the protruding piece 64. As a result, the solder adhesion reinforcing layer (such as the tin-containing layer) formed on the outer surface of the protruding piece 64 becomes less likely to deteriorate due to heat and the bonding strength of a circuit substrate 3 and the terminal electrode 60 during mounting is improved.

In addition, the part where the lead portion 101 of the wire 100 is connected to the terminal electrode 60 is separated from the flange portion 16, and thus it also becomes difficult for the heat for connecting the lead portion 101 of the wire 100 to the folded piece 74 to be transferred to the flange portion 16 of the core 10 and deterioration of the core 10 can also be prevented. In addition, for the same reason, work for connecting the lead portion 101 of the wire 100 to the folded piece 74 (such as laser welding or thermocompression bonding) is facilitated.

In the present embodiment in particular, the part where the lead portion 101 is connected to the terminal electrode 60 is separated from the upper surface of the flange portion 16 by the predetermined height L3 or more, and thus the heat for connecting the lead portion 101 of the wire 100 to the terminal electrode 60 is unlikely to be transferred to the flange portion 16 as well as the lower part of the terminal main piece 62.

In addition, in the present embodiment, a space gap is formed so that no lead portion 101 of the wire 100 is present between the base piece 68 and the folded piece 74. In a case where the lead portion 101 of the wire 100 enters between the base piece 68 and the folded piece 74, the lead portion 101 of the wire 100 that has entered the space gap serves as a heat transfer member and the heat for bonding the lead portion 101 may be directly transferred from the lead portion to the base piece 68.

However, in a case where the space gap is formed between so that no lead portion 101 of the wire 100 is present the base piece 68 and the folded piece 74, heat transfer from the lead portion 101 of the wire that has entered the space gap to the base piece 68 can be effectively prevented. In addition, by the space gap being formed, a jig or the like for connecting the wire lead portion to the folded piece can be inserted into the gap space and the connection workability is improved.

In the present embodiment, the total length (L2+L3+L4) extending along the inner surface of the space gap from the position of the base piece 68 corresponding to the outer end surface 24 of the flange portion 16 toward the tip of the folded piece 74 is preferably twice or more the width T0 of the flange portion 16. The lead portion 101 of the wire 100 is bonded in the tip portion of the folded piece 74, and thus the heat generated in the tip portion of the folded piece 74 is transferred from the tip of the folded piece 74 to the base piece 68 along the total length extending along the inner surface of the space gap and can be dissipated with a sufficient length.

In addition, the lead portion 101 is pulled out from the winding core portion 12 toward the upper portion of the folded piece 74 and extends outward along the upper portion of the folded piece 74. With such a configuration, the lead portion 101 can be connected to the tip portion of the folded piece 74 without entering the space gap and heat dissipation is improved.

Further, the width L3 of the space gap between the folded piece 74 and the base piece 68 has an interval that is, for example, 0.3 times or more the thickness D of the wire 100. In addition, the lead portion 101 does not enter between the folded piece 74 and the base piece 68 and the lead portion 101 is directly guided from the winding core portion 12 onto the folded piece 74. With such a configuration, heat is not directly transferred from the lead portion 101 to the base piece 68 and so on and heat dissipation is improved.

Further, in the present embodiment, at least a part of the bonding part where the lead portion 101 is connected at the tip of the folded piece 74 protrudes beyond the outer end surface 24 of the flange portion 16. With such a configuration, work for connecting the lead portion 101 of the wire 100 to the folded piece 74 is facilitated and it becomes difficult to transfer the heat for connecting the lead portion 101 of the wire 100 to the folded piece 74 to the base piece 68.

Further, the gap having the predetermined width W4 is formed between the base piece 68 and the upper surface 20 of the flange portion 16. The gap W4 suppresses heat transfer from the base piece 68 to the flange portion 16. In addition, the heat dissipation of the base piece 68 itself is also improved.

In addition, the folded piece 74 has the caulking piece 76 holding the lead portion 101 of the wire 100. By the caulking piece 76 holding the lead portion 101 of the wire 100, work for connecting the lead portion 101 to the wire connectable portion 70 is facilitated.

In addition, in the present embodiment, the protruding piece 64 protruding from the outer end surface 24 of the flange portion 16 is formed on the terminal main piece 62 close to the mounting piece 66. Accordingly, although the stress that is generated in the circuit substrate 3 or the like is transmitted to the mounting piece 66 of the terminal electrode 60, it becomes difficult to transmit the stress to the flange portion 16 of the core 10 as the protruding piece 64 functions as a stress buffer when the stress is transmitted from the mounting piece 66 to the terminal main piece 62 through the protruding piece 64. Accordingly, in the coil device 1 according to the present embodiment, the stress that is transmitted to the core 10 can be mitigated, cracking or the like of the core 10 can be effectively prevented, and durability is improved.

In addition, the protruding piece 64 protrudes from the outer end surface 24 of the flange portion 16 (actually, the lateral outer end surface 30 or 32). Accordingly, when the mounting piece 66 of the terminal electrode 60 is connected to a land 4 or the like of the circuit substrate 3 with the solder 5 or the like, the solder 5 adhered to the mounting piece 66 crawls up from the mounting piece 66 along the outer surface 60*a* of the protruding piece 64 and a solder fillet is formed. By the solder fillet being formed on the outer surface 60*a* of the protruding piece 64, the state of the solder fillet can be confirmed with ease in a case where the coil device 1 connected to the circuit substrate 3 is viewed from above (plan view) and mounting inferiority can be efficiently suppressed.

In addition, in the present embodiment, a gap having a predetermined width W2 is formed between the outer end surface 24 of the flange portion 16 and the protruding piece 64 of the terminal electrode 60. By the gap that has the predetermined width W2 being formed, the stress buffering function is improved, the area of contact between the terminal electrode 60 and the core 10 is also reduced, the stress from the substrate 3 becomes less likely to be transmitted to the core 10, and durability is improved.

In addition, in the present embodiment, the terminal main piece 62 is adhered to the outer end surface 24 of the flange portion 16 at a position closer to the wire connectable portion 70 than the protruding piece 64. With such a configuration, the adhesion position between the terminal electrode 60 and the core 10 becomes far from the mounting piece 66, stress transmission from the circuit substrate 3 or the like to the core 10 through the terminal electrode 60 is further reduced, and durability is further improved.

In addition, in the present embodiment, the mounting piece 66 of the terminal electrode 60 and the mounting side lower surface 22 of the flange portion 16 are relatively movable. Accordingly, the stress from the circuit substrate 3 or the like is not directly transmitted from the mounting piece 66 of the terminal electrode 60 to the mounting side lower surface 22 of the flange portion 16 of the core 10 and the stress buffering function is also improved. It should be noted that the mounting piece 66 of the terminal electrode 60 and the mounting side lower surface 22 of the flange portion 16 may be partially in contact with each other.

In addition, in a case where the mounting piece 66 is in contact with the mounting side lower surface 22 of the flange portion 16 in the present embodiment, positioning can be facilitated in fixing the terminal electrode 60 to the flange portion 16 of the core 10. Meanwhile, transmission of the stress generated in the substrate 3 to the core 10 can be more effectively prevented in a case where there is a gap between the mounting piece 66 and the mounting side lower surface 22 of the flange portion 16.

In addition, in the present embodiment, the width W1 of the mounting side lower surface 22 side of the lateral outer end surface 30 is designed to be smaller than the width W2 of the mounting piece 66 of the terminal electrode 60 as illustrated in FIG. 2. Accordingly, the solder 5 illustrated in FIG. 4 can be effectively prevented from wrapping around from the side surface 26 side of the flange portion 16 illustrated in FIG. 2 to the flange portion 16 and coming into contact with the flange portion 16.

Second Embodiment

Figure 1B:
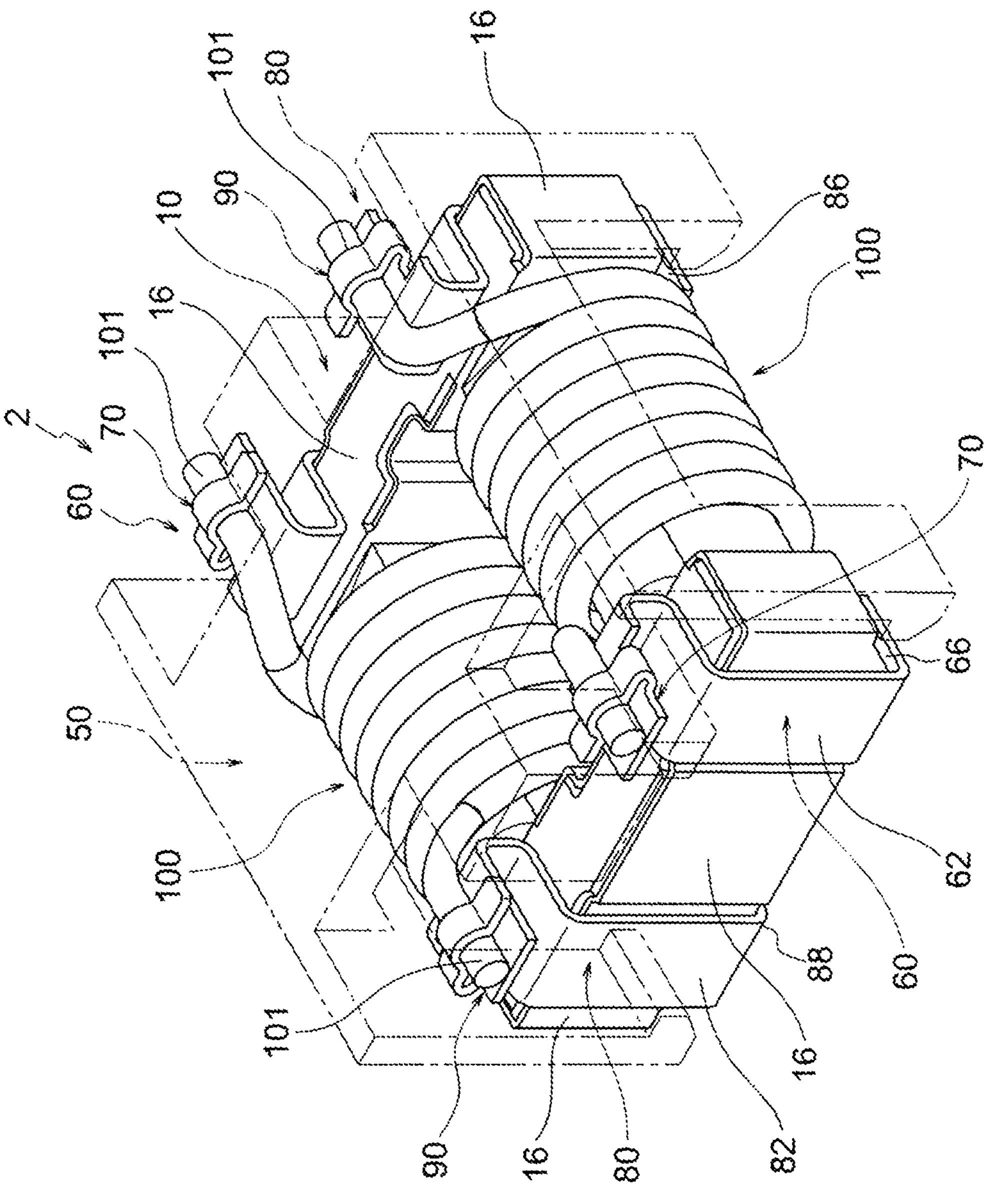
FIG. 1B is a perspective view of a coil device according to another embodiment of the present invention.

A coil device 2 according to another embodiment of the present invention illustrated in FIG. 1B is a modification example of the coil device 1 according to the first embodiment described above. The coil device 2 is similar in configuration, action, and effect to the coil device 1 except for the followings. Hereinafter, mainly the parts different from the coil device 1 according to the first embodiment will be described with redundant description omitted. However, the description is common to both in part.

As illustrated in FIG. 1B, in the coil device 2 of the present embodiment, the terminal electrodes 60 and 80 do not have protruding pieces. The terminal main pieces 62 and 82 extend to the mounting side lower surface 22 of the flange portion 16 and are directly connected to the mounting pieces 66 and 86.

Also in the coil device 2 according to the present embodiment, the lead portion 101 connected to the wire connectable portion 70 is arranged at a predetermined height from the upper surface 20 of the flange portion 16. Accordingly, the heat generated when the lead portion 101 is connected to the terminal electrode 60 can be prevented from being transferred as high heat to the vicinity of the mounting piece 66 of the terminal electrode 60. Accordingly, solder adhesion reinforcing layers such as the tin-plated layers formed on the outer surfaces of the terminal electrodes 60 and 80 are unlikely to be partially melted and removed near the mounting pieces 66 and 86 of the terminal electrodes 60 and 80. As a result, a solder fillet is formed with ease and the mounting inferiority of the coil device 2 with respect to the circuit substrate or the like can be reduced.

In addition, the parts where the lead portions 101 of the wires 100 are connected to the wire connectable portions 70 and 90 are separated from the flange portion 16, and thus it also becomes difficult for the heat for connecting the lead portions 101 of the wires 100 to the wire connectable portions 70 and 90 to be transferred to the core 10 and deterioration of the core 10 can also be prevented. In addition, for the same reason, work for connecting the lead portions 101 of the wires 100 to the wire connectable portions 70 and 90 (laser welding or thermocompression bonding) is facilitated.

It should be noted that the present invention is not limited to the embodiments described above and can be variously modified within the scope of the present invention.

For example, although the wires 100 are wound in the opposite directions around the winding core portions 12 and 14 of the coil devices 1 and 2 in the embodiments described above, the wires 100 may be wound in the same direction depending on the applications of the coil devices 1 and 2. In addition, the coil device may have only one winding core portion 12 or 14 or may have three or more winding core portions. The application of the coil device is not limited to a common mode filter, a common mode choke coil, or the like. The coil device can also be used as a balun transformer, a pulse transformer, a choke coil, a signal transformer, a winding product, and so on.

EXPLANATIONS OF LETTERS OR NUMERALS

1, 2 COIL DEVICE
3 SUBSTRATE
4 LAND
5 SOLDER
10 CORE
12, 14 WINDING CORE PORTION
16 FLANGE PORTION
20 UPPER SURFACE
22 MOUNTING SIDE LOWER SURFACE
24 OUTER END SURFACE
**24*a*** CENTRAL OUTER END SURFACE
25 INNER END SURFACE
26 FIRST SIDE SURFACE
28 SECOND SIDE SURFACE
30, 32 LATERAL OUTER END SURFACE
34, 36 LOCKING RECEIVING PORTION
38 GROOVE PORTION
50 COVER
51 LID PORTION
52, 53 LEG PORTION
54, 55 LOCKING CLAW
56 PARTITION PORTION
57 NOTCH
58 PROJECTING BLOCK PORTION
60, 80 TERMINAL ELECTRODE
**60*a*, 80*a*** OUTER SURFACE
**60*b*, 80*b*** INNER SURFACE
62, 82 TERMINAL MAIN PIECE (TERMINAL MAIN PORTION)
64, 84 PROTRUDING PIECE (PROTRUDING PORTION)
66, 86 MOUNTING PIECE (MOUNTING PORTION)
68, 88 BASE PIECE
70, 90 WIRE CONNECTABLE PORTION
72, 92 RISING PIECE
74, 94 FOLDED PIECE
76, 96 CAULKING PIECE
100 WIRE
101 LEAD PORTION

What is claimed is:

1. A coil device comprising:
a core having a flange portion connected to a winding core portion;
a wire wound around the winding core portion; and
a terminal electrode attached to the flange portion, wherein
the terminal electrode comprises a wire connectable portion to which a lead portion of the wire is connected,
the lead portion connected to the wire connectable portion is arranged at a predetermined height from an upper surface of the flange portion,
the wire connectable portion has a base piece arranged with a gap width between the upper surface of the flange portion and the base piece, and a folded piece connected and extending to the base piece and folded back from the base piece,
a space gap is formed so that no wire is present between the base piece and the folded piece,
a total length extending along an inner surface of the space gap from a position corresponding to an outer end surface of the flange portion, which is arranged with the gap width, toward a tip of the folded piece is twice or more a width of the flange portion, and
the terminal electrode is configured such that a heat generated in the tip of the folded piece is transferred from the tip of the folded piece to the base piece, which is not in contact with the core, along the total length extending along the inner surface of the space gap, and is dissipated.

2. The coil device according to claim 1, wherein
the lead portion of the wire is connected to the folded piece.

3. The coil device according to claim 2, wherein
a width of the space gap is 0.3 times or more a wire diameter of the wire.

4. The coil device according to claim 2, wherein the lead portion is pulled out from the winding core portion toward an upper portion of the folded piece and extends outward along the upper portion of the folded piece.

5. The coil device according to claim 2, wherein at least a part of a bonding part where the lead portion is connected at the tip of the folded piece protrudes beyond an outer end surface of the flange portion.

6. The coil device according to claim 2, wherein the folded piece has a caulking piece holding the lead portion of the wire.

7. The coil device according to claim 1, wherein the terminal electrode further comprises:
a terminal main portion arranged on the outer end surface of the flange portion with one end of the terminal main portion connected to the wire connectable portion, and
a mounting portion provided at an other end of the terminal main portion; and
the terminal main portion close to the mounting portion has a protruding portion protruding in a direction away from the outer end surface of the flange portion.

8. The coil device according to claim 7, wherein a predetermined gap is formed between the outer end surface of the flange portion and the protruding portion of the terminal electrode.

9. The coil device according to claim 1, wherein the core further has another winding core portion arranged in parallel to the winding core portion and connected to the flange portion.

10. The coil device according to claim 1, further comprising a cover attached to the flange portion, wherein the cover is above an upper part of the winding core portion around which the wire is wound is covered.

11. The coil device according to claim 10, wherein a notch is formed in the cover and the notch accommodates the wire connectable portion.

* * * * *